C. DRESSLER.
OVEN FOR USE IN THE MANUFACTURE OF TILES, POTTERY, AND THE LIKE.
APPLICATION FILED FEB. 15, 1911.

1,023,628.

Patented Apr. 16, 1912.

5 SHEETS—SHEET 1.

Witnesses:
N. Meem
Ann Butler

Inventor:
Conrad Dressler
By Mason Fenwick Lawrence
Attorneys

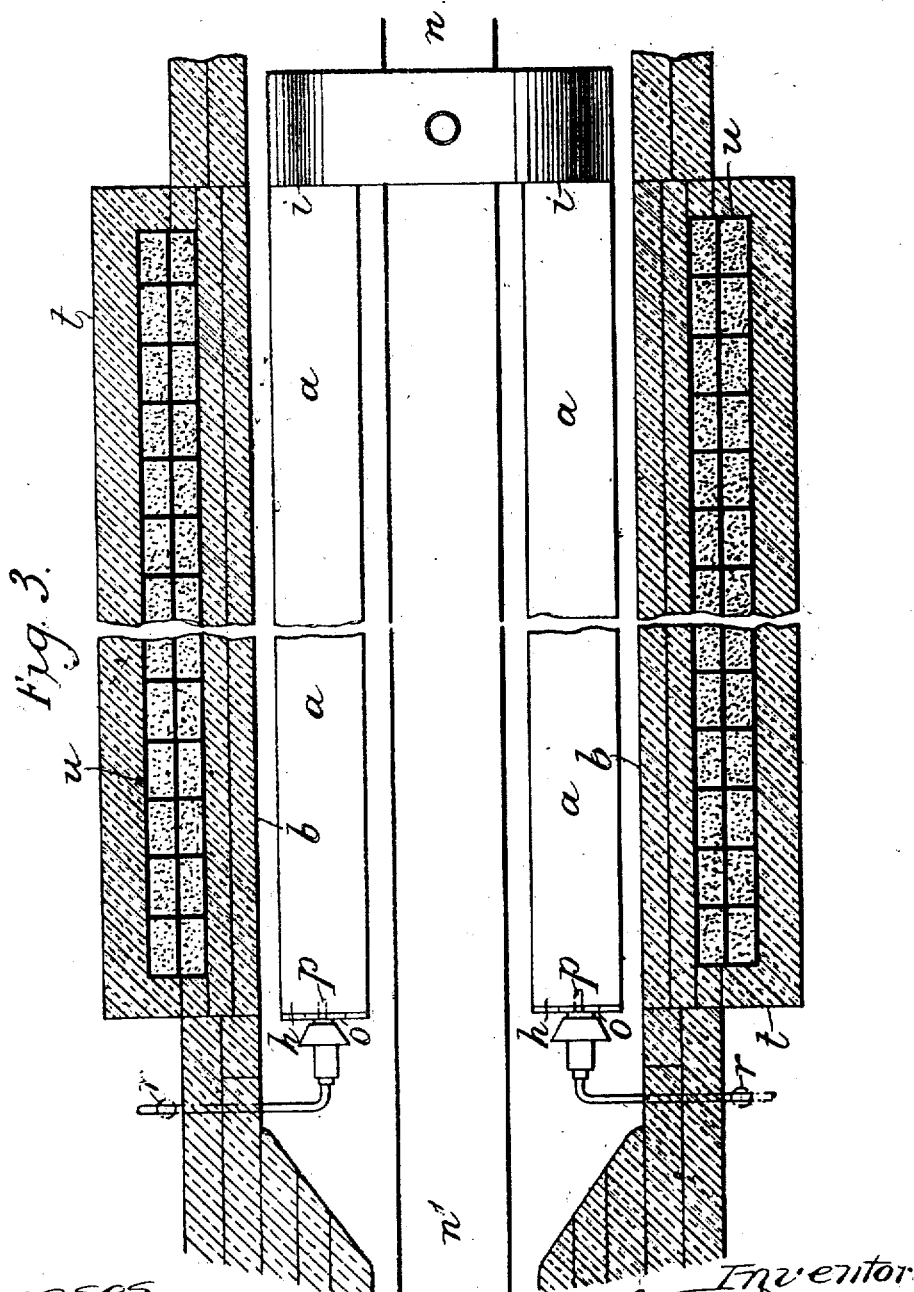

C. DRESSLER.
OVEN FOR USE IN THE MANUFACTURE OF TILES, POTTERY, AND THE LIKE.
APPLICATION FILED FEB. 15, 1911.
1,023,628.
Patented Apr. 16, 1912.
5 SHEETS—SHEET 3.
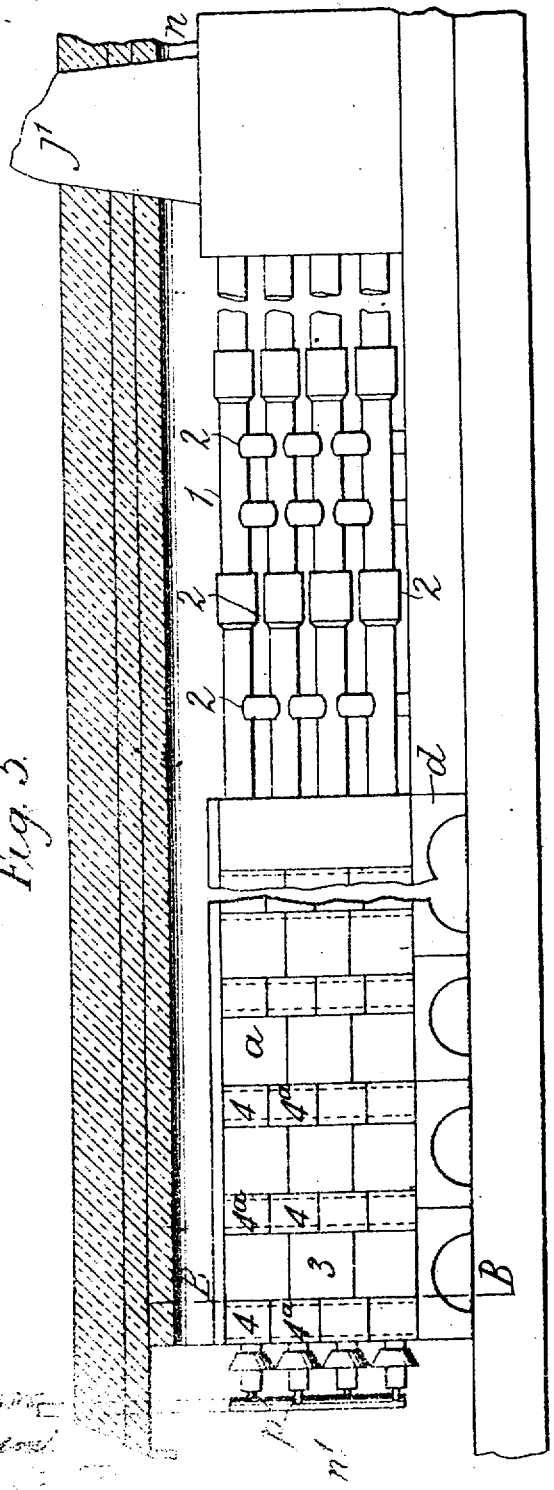
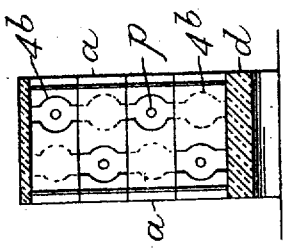

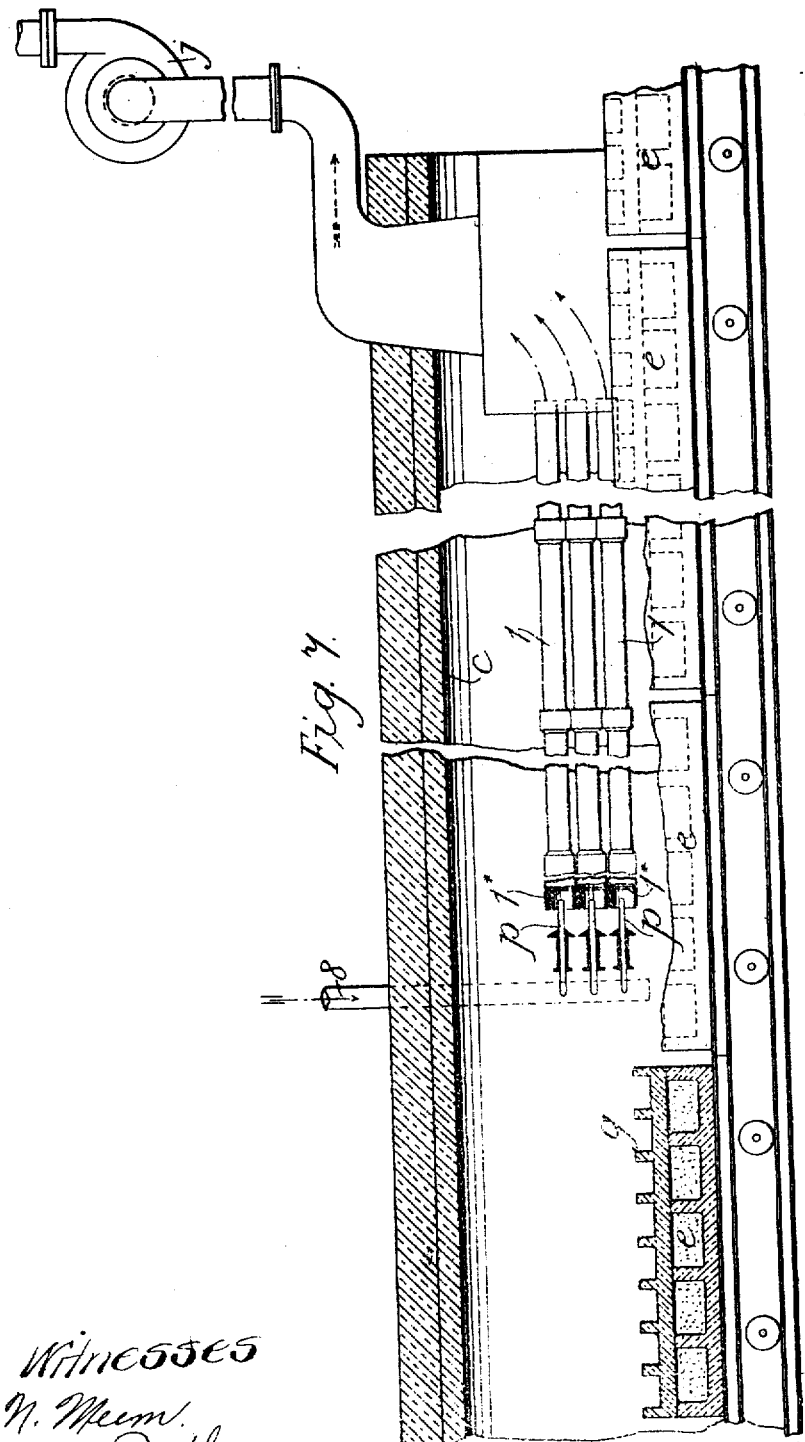

C. DRESSLER.
OVEN FOR USE IN THE MANUFACTURE OF TILES, POTTERY, AND THE LIKE.
APPLICATION FILED FEB. 15, 1911.

1,023,628.

Patented Apr. 16, 1912.

Witnesses:
N. Meem
Ann Butter

Inventor,
Conrad Dressler
By Mason Fenwick & Lawrence
Attorneys

UNITED STATES PATENT OFFICE.

JOSEPH BIERSCHENK, OF IVRY PORT, FRANCE.

BALL-BEARING.

1,023,614.  Specification of Letters Patent.  Patented Apr. 16, 1912.

Application filed October 27, 1905. Serial No. 284,614.

*To all whom it may concern:*

Be it known that I, JOSEPH BIERSCHENK, a subject of the German Empire, residing at Ivry Port, Seine, France, have invented certain new and useful Improvements in Ball-Bearings, of which the following is a specification.

My invention has relation to a ball bearing; and in such connection it relates to the particular arrangement of the raceways for balls formed in contiguous faces of two concentric members or rings and to means and the manner of inserting and retaining the balls in the same.

The principal objects of my invention are first, to provide a ball bearing formed of two concentric members or rings at their contiguous faces with raceways varying in depth and width and adapted to receive and retain balls introduced into the same; second, to provide the inner face of the outer member with inclined portions terminating in the raceway, whereof the inclined portions enable the introduction of the balls into the raceways of the members; and third, to provide a ball-bearing with a retainer for the balls arranged to facilitate introducing the same between the rings and for holding the balls apart therein.

The nature and scope of my present invention will be more fully understood from the following description taken in connection with the accompanying drawings forming part hereof, in which—

Figure 1:
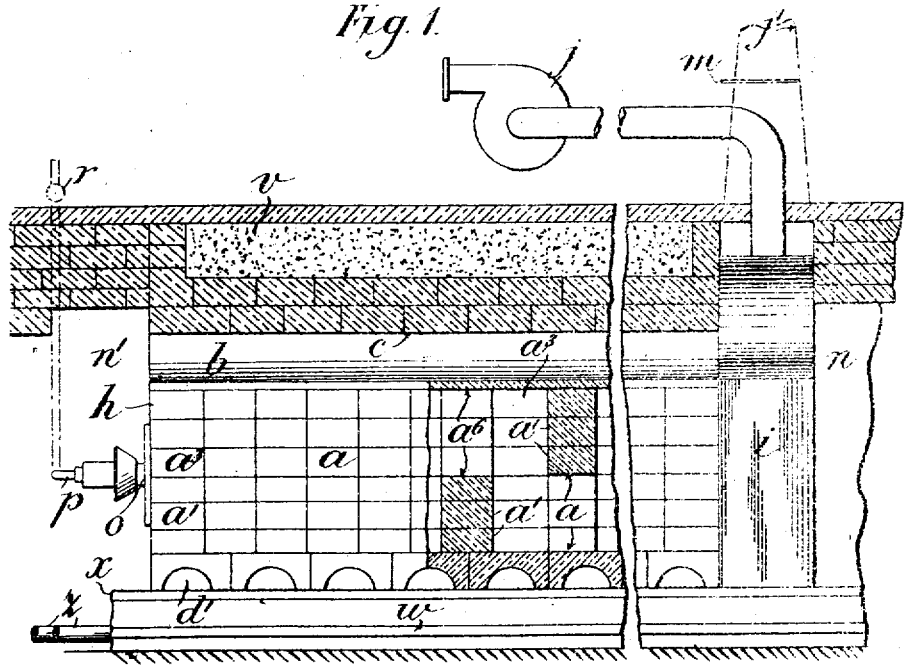
Figure 2:
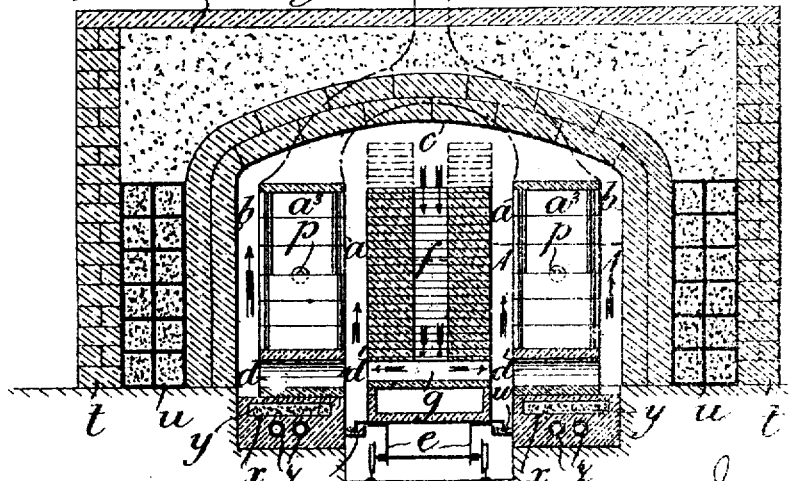
Figure 4:
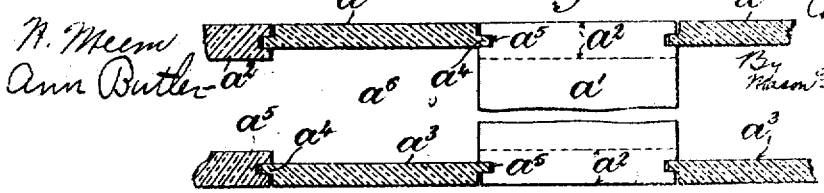

Figure 1, is a view illustrating in cross-section downwardly inclined portions terminating in a centrally arranged raceway in the inner face of the outer member, a ball partly engaging raceways of both members and a retainer or ring partly surrounding the ball. Fig. 2, is a view, reduced, illustrating partly in side elevation and partly in section, the ball bearing and the retainer for the balls interposed between the rings forming the same; and Fig. 3, is a detail view, illustrating perspectively, the retainer and balls projecting therefrom.

Referring to the drawings, $a$ represents the balls or spherical bodies preferably formed of steel, which are interposed between the annular members or rings $c$ and $c^1$, forming in conjunction with the balls a ball-bearing A. The balls $a$, are held in position between the rings $c$ and $c^1$, solely by engaging raceways $b$, arranged centrally in contiguous faces of the same, which raceways are preferably shallow to offer only a portion of their surface, as bearings for the balls $a$. The depth of the raceways $b$, is chosen in a certain relation to the elasticity of the material of the rings $c$ and $c^1$, and balls $a$, to permit of the introduction of the balls $a$, between the members $c$ and $c^1$, by springing the same successively sidewise into the raceways $b$, of the rings $c$ and $c^1$. The balls $a$, during the introduction are held in the raceway $b$, of the inner member, by a retainer $e$, remaining in engagement with the balls after the same have been inserted between the rings. The raised portions $g$ and $g^1$, inclosing the raceways $b$, form when the members occupy their proper position with respect to each other an annular space, which is less in width than the diameter of the balls, so that the balls can only be inserted into the raceways $b$, by the elastic deformation of both members. However, as the balls $a$, are already placed in the raceway $b$, of the inner member $c^1$ the balls $a$, have only to pass over one of the raised portions of the outer member, which may be inclined toward the raceway $b$. Thus the balls when resting in the raceway of the inner member $c^1$, are only slightly greater in diameter than the distance from the deepest portion of the raceway $b$, of the inner member to the edges of the raceway $b$, of the outer member. Moreover, as the balls are successively sprung into the raceways the necessary elastic deformation of both members to spring the balls $a$, into the raceway of the outer member is comparatively slight; and therefore, the members may be comparatively thick in cross-section.

When the balls $a$, are held in position in the raceway $b$, of the inner member by a retainer of a type which is as shown in Figs. 2 and 3, the bearing A, may be assembled, by first springing two diametric oppositely arranged balls $a$, resting in the raceway of the inner member by elastic deformation of both members into the raceway of the outer member, the rings during this operation being at right angles to each other and then swinging the inner member upon the introduced balls, as fulcral points sidewise into a concentric position, with respect to the outer member, thus springing by elastic deformation of both members the balls of the inner member at each side of the fulcrul balls, successively into the raceway of the outer member. The bearing may also be Figs. 7 and 8 are views similar to Figs. 1 and 2 showing another modification.

In the example shown in Figs. 1 to 4 inclusive, two heating chambers $a$ are employed in the form of long narrow hollow walls arranged parallel to but at a slight distance from the inner side of the adjacent main walls $b$ of a tunnel oven having a roof $c$ of vault shape, the said hollow walls $a$ being carried by arched or hollow bricks $d$ or the like, which form the bottom thereof, and extending to within a short distance of the roof $c$ of the oven, so that air can circulate all around each of them. The goods when placed on trucks $e$ may be so arranged as to leave vertical passages $f$ for the downward flow of the hot air, and, at the platform level, which should correspond more or less with the openings $d^1$ in the arched bricks $d$, horizontal passages $g$ may be provided so as to secure a proper circulation of the cooled air under the heated bottom of the heating chambers. A mixture of air and gas is supplied separately into each heating chamber $a$ at one end $h$, which may be at or near the middle of the length of the oven, the products of combustion being drawn off at the other end $i$, which is at or near the entrance to the tunnel, by a fan $j$ so that by controlling the supply of gas and the speed of the fan, the draft and the heating effect, can be varied with certainty. Or, if a chimney such as is indicated at $j^1$, be used instead of a fan, then its power of suction must be in excess of what is needed so as to enable the draft to be regulated by means of a damper $m$ or the equivalent. In this way it is insured that leakage of gases or fumes from the heating chambers into the oven, to the injury of goods therein, is avoided. The gas to be burned may be supplied to the heating chambers through burners $p$ extending from the outside of the tunnel and provided with cocks $r$. The air for combustion of the fuel is drawn by the draft, due to the fan $j$, or chimney $j^1$, from the exit or cooling portion $n^1$ of the tunnel through which the goods pass, the air being gradually heated by the goods which are correspondingly cooled. The inflow of air into the combustion chambers through the openings $o$ may be assisted by the action of the issuing gas which may be supplied to the burners $p$ under pressure and in controlled amount from a gas holder. On the other hand, if the burners be supplied with crude gas direct from a gas producer, the cocks $r$ will be replaced by dampers and the suction of the fan or chimney will assist to draw off the gas from the gas producer. The heating chambers $a$ may conveniently each be built up of transverse partitions that are composed of superimposed blocks $a^1$, $a^2$ of fire clay, and are spaced apart longitudinally and keyed together by superimposed longitudinally arranged and comparatively thin slabs $a^3$ having projections $a^4$ adapted to enter grooves or recesses $a^5$ in the blocks $a^1$, $a^2$ so as to allow for free expansion and contraction of the connected parts. By making the blocks $a^1$ long and the blocks $a^2$ short in a transverse direction, as shown, the transverse partitions are formed with passageways $a^6$ alternately at top and bottom so as to form a lengthened zig-zag passage through which the products of combustion flow, at the same time causing practically all parts of the wall to be uniformly heated. The thick transverse blocks $a^1$ act as accumulators of heat while the thin side walls $a^3$ and the short blocks $a^2$ forming the sides of the passageways $a^6$, permit heat to readily radiate into the oven. Blocks corresponding to $a^1$, $a^2$ could also be arranged checkerwise, more or less after the manner of the bricks or blocks in a heat regenerator, so as to form a tortuous passage of any desired length. Each heating chamber is supported on a thin layer of refractory granular material, for example quartz sand, spread over a bed plate, so that it can move bodily in the longitudinal direction under the force of expansion should the expansion joints provided in the walls of the chamber prove insufficient for the purpose. In order to prevent, as far as possible, radiation of heat to the outside of the oven, the interior of the oven may be lined with a hard enamel to provide a heat reflecting surface, while the outer walls $b$ may be lagged with suitable material such as kieselguhr, ground ashes or the like, confined by an outer casing $t$, but in lieu of simply filling the intervening space between the walls $b$ and outer casing $t$ with such material, which would have a tendency to settle and exert undue lateral pressure upon the walls and casing, tending to distort the same, the material is preferably filled into boxes or containers $u$, preferably cube shaped, made of earthenware, the said boxes or containers being piled one on the top of another, any space between them being filled with loose material. Lagging material $v$ may also be applied to the exterior of the roof $c$ of the tunnel. To prevent undue transmission of heat from the heating chambers $a$ to the metal troughs $w$ usually provided in tunnel ovens for containing sand to effect an air tight joint between the movable trucks $e$ and the lower portions of the tunnel, the ledges carrying the heating chambers may have formed therein channels $x$ filled with loose non-conducting material $y$, such as kieselguhr, ground fireclay or ashes. In the lower portion of this mass $y$ of material or, it may be, in the wall below it, may be placed one or more pipes $z$ through which cold air can be drawn to remove such excess of heat as reaches this part of the oven. The air thus heated may be used for drying purposes.

In the modified construction shown in Figs. 5 and 6, each heating chamber $a$ is, for part of its length, made of rectangular or substantially rectangular form externally with internal transverse partitions built up of blocks arranged to form a zig-zag or tortuous passage or passages for the hot gases and products of combustion and for the remainder of its length is composed of superimposed rows of pipes 1 through which the products of combustion are drawn and gradually give up their heat to the goods. The combustion chamber proper at the inlet end of each heating chamber $a$ is provided with one or more gas or oil burners $p$ and inlets $o$ for air, and the rows of pipes 1 are connected at their exit ends to the exhausting device used, namely the fan $j$, or chimney $j^1$, the pipes in each row thereof being fitted together, for example spigot and faucet fashion, so as to permit of free expansion and contraction thereof. The arrangement is such as to allow of fuel being readily burned and of the resulting hot gases freely expanding in the combustion chamber proper and then flowing freely through the rows of pipes, which have a large heat radiating surface, to the exhausting device so that the hot gases gradually give off their heat and escape at a comparatively low temperature. As a consequence, when the goods to be treated travel through the oven, they will, as in the previous example, be gradually raised in temperature until they reach that part of the heating chamber where combustion takes place and where they will be subjected to the greatest heat, after which they gradually fall in temperature as they pass through the part $n^1$ of the tunnel beyond the heating chamber or chambers. The rows of pipes 1 may be separated from one another and supported and held together by interposed bearers 2 of refractory material. In the example, each heating chamber $a$ is built up of comparatively thin superposed blocks 3 arranged longitudinally and connected, as in Fig. 4, by expansion joints to the transverse walls which are composed of blocks 4, 4$^a$ shaped and arranged to form openings 4$^b$ through which fuel and air, or hot gases, flow, the openings 4$^b$, or some of them, in the several walls, being non-coincident to any desired extent so as to form a tortuous passage of any desired length.

Figure 8:
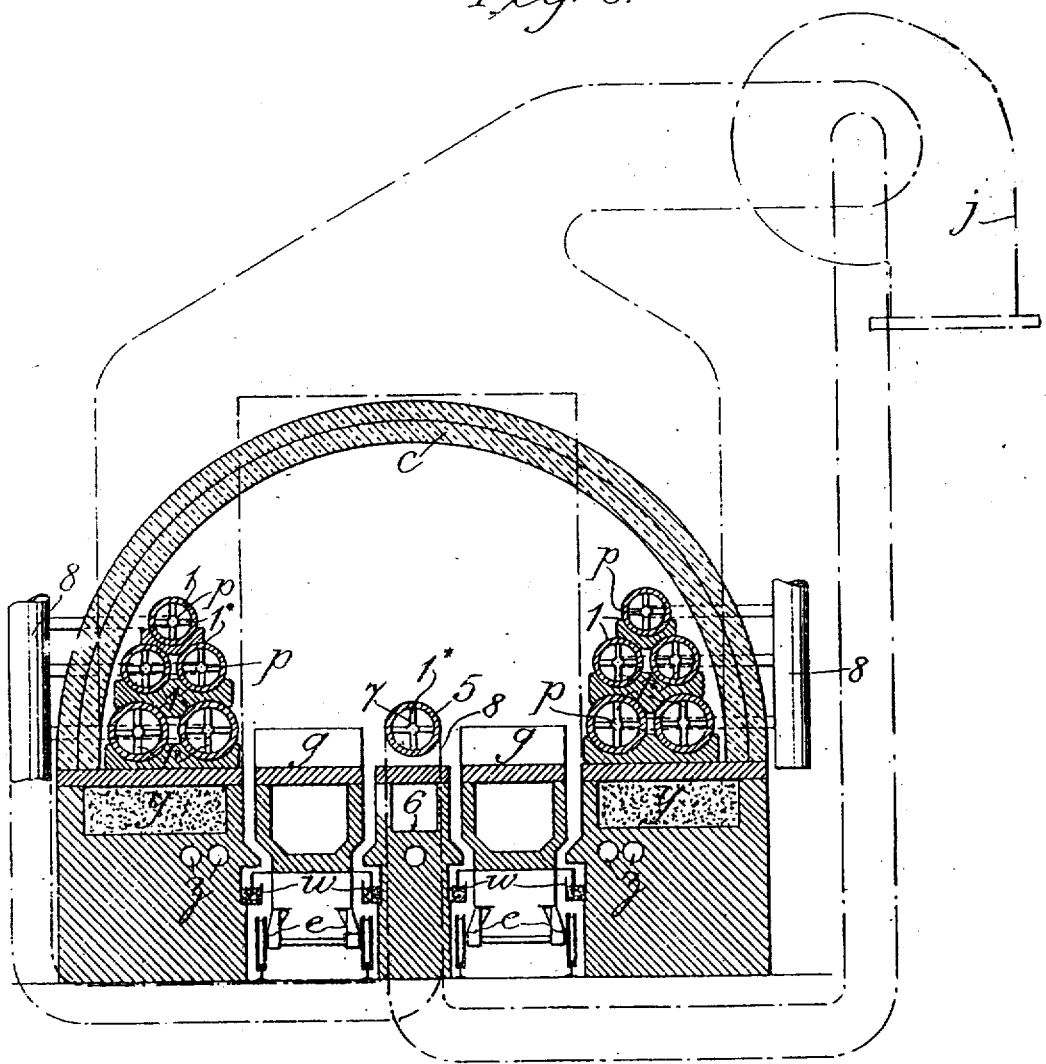

In the modification shown in Figs. 7 and 8, the heating chambers at opposite sides of the main chamber of the oven, are wholly constituted by rows of pipes 1 fitted together spigot and faucet fashion so as to permit of unrestrained expansion and contraction, there being a gas burner $p$ for each row of pipes. The pipes near the inlet ends of the rows may be of larger diameter than those at the outlet ends, in order to allow the gases, while burning, to expand more easily; and, if desired, baffles 1* may be fitted to secure a good mixture of the air and gas in the pipes, to act as accumulators of heat, and to shorten the length of the combustion zone. According to this modification also, two sets of rails extend through the oven and an additional heating chamber, comprising a single row of pipes 5, is disposed above the wall 6 between the two sets of rails, this row of pipes being supplied at one end, like the rows of pipes 1, with gas through a burner 7 from a supply pipe 8 and with heated air, the opposite end of the row of pipes being connected, as by a common pipe or conduit, to the fan $j$, or chimney. The oven may have more than two sets of rails and one intermediate heating chamber.

The heating chambers being of small height and arranged longitudinally, each unit length thereof is of comparatively small weight and therefore free from liability to collapse by reason of excessive superincumbent weight.

In addition to lining the oven with a hard enamel to provide a heat reflecting surface, the trucks $e$ may, if desired, also have heat reflecting surfaces applied thereto; also each truck may have a platform of cellular construction filled with non-refractory material such as kieselguhr, or the like to minimize loss of heat therethrough.

Heating chambers such as described may be used in connection with intermittent ovens.

What I claim is:—

1. A tunnel oven comprising a main chamber through which goods to be heated can be caused to travel, and a heating chamber that is structurally independent of the side walls and roof of the oven and is arranged longitudinally within said main chamber at one side thereof and at a distance from the adjacent side and roof of said main chamber so as to form therewith an air circulating path extending around said heating chamber in the vertical direction.

2. A tunnel oven comprising a main chamber through which goods to be heated can be caused to travel, and heating chambers supported longitudinally within and at opposite sides of a portion of the main chamber and arranged at a distance from the side walls and roof thereof, said heating chambers being structurally independent of and capable of longitudinal expansion independently of the main chamber.

3. A tunnel oven comprising a main chamber through which goods to be heated can be caused to travel, heating chambers arranged longtiudinally within and structurally independent of the main chamber at opposite sides of the passageway therethrough for goods and at a short distance from the side walls and roof of such main chamber so that heated air can circulate around such heating chamber, means for supplying combustible material with air to one end portion of each heating chamber and exhausting means for withdrawing products of combustion from the other end of each heating chamber.

4. A tunnel oven comprising a main chamber through which goods to be heated can be caused to travel, heating chambers arranged longitudinally within and structurally independent of said main chamber and at a distance from the side walls thereof, said heating chambers being each composed of slabs or blocks of refractory material arranged to form a hollow rectangular longitudinally disposed wall having a combustion chamber therein at one end and a zig-zag passageway therethrough for products of combustion, and exhausting means connected to said passageway.

5. A tunnel oven comprising a main chamber through which goods to be heated can be caused to travel, heating chambers arranged longitudinally within and structurally independent of said main chamber and at a distance from the side walls and roof thereof, said heating chambers being each composed partly of slabs or blocks of refractory material arranged to form a hollow rectangular longitudinally disposed wall having a combustion chamber therein at one end and a zig-zag passageway therethrough for products of combustion, and partly of longitudinally arranged rows of pipes connected at one end to said hollow wall, and exhausting means connected to the other end of the rows of pipes.

6. In a tunnel oven, a heating chamber comprising a hollow rectangular wall arranged longitudinally within and structurally independent of the oven and rows of pipes connected to and extending longitudinally from the hollow wall, means for introducing air and combustible fluid into one end of the hollow wall and means for exhausting products of combustion from the opposite ends of the rows of tubes.

7. In a tunnel oven, a heating chamber comprising a hollow rectangular wall arranged longitudinally within and structurally independent of the oven and rows of pipes connected to and extending longitudinally from the hollow wall, said hollow wall having therein transversely arranged blocks or slabs arranged to form zig-zag passageways therethrough, means for introducing air and combustible fluid into one end of the hollow wall and means for exhausting products of combustion from the opposite ends of the rows of tubes.

8. A tunnel oven comprising a main chamber through which goods to be heated can be caused to travel, heating chambers arranged longitudinally at opposite sides of said main chamber and at a short distance from the walls and roof thereof so that air can circulate around each of them and through the passageway for goods left between said chambers, a heating chamber arranged at the central portion of the main chamber, means for introducing combustible material and air into one end of each of said heating chambers and means for withdrawing products of combustion from the other ends of said heating chambers.

9. A tunnel oven comprising a main chamber having at the bottom thereof a longitudinal passageway for vehicles carrying the goods to be heated, longitudinally arranged heating chambers, made separate from and movably supported within said main chamber upon the lower side walls at opposite sides of the said passageway so that the said heating chambers are at a higher level than the bottom of the passageway upon which the vehicles travel and masses of loose refractory non-conducting material arranged within longitudinal recesses in the said lower side walls of the passageway below the heating chambers for the purpose specified.

10. A tunnel oven comprising a main chamber having at the bottom thereof a longitudinal passageway for vehicles carrying the goods to be heated, longitudinally arranged heating chambers made separate from and movably supported within said main chamber upon the lower side walls at opposite sides of the said passageway so that the said heating chambers are at a higher level than the bottom of the passageway upon which the vehicles travel and longitudinally arranged air conduits out of communication with said passageway and through which air can be caused to flow, said air conduits being arranged to abstract heat that has passed from the heating chambers to the said lower side walls.

11. A tunnel oven comprising a main chamber having at the bottom thereof a longitudinal passageway for vehicles carrying the goods to be heated, longitudinally arranged heating chambers made separate from and movably supported within said main chamber upon the lower side walls at opposite sides of the said passageway so that the said heating chambers are at a higher level than the bottom of the passageway upon which the vehicles travel, masses of loose refractory non-conducting material arranged within longitudinal recesses in the said lower side walls below the heating chambers and longitudinal air heating conduits also arranged in the lower side walls of said passageway below said recesses and out of communication with said passageway and through which air can be caused to flow for the purpose set forth.

Signed at London, England, this third day of February 1911.

CONRAD DRESSLER.

Witnesses:
RIPLEY WILSON,
C. P. LIDDON.